March 16, 1954 W. SLIWIAK 2,671,951
TRANSFORMER CORE AND METHOD OF MAKING SAME
Filed Oct. 3, 1949
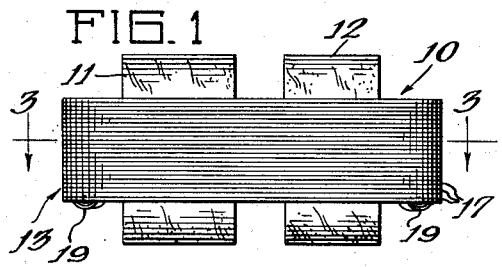
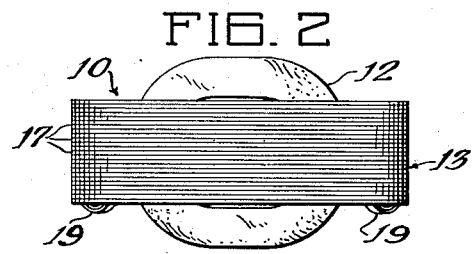
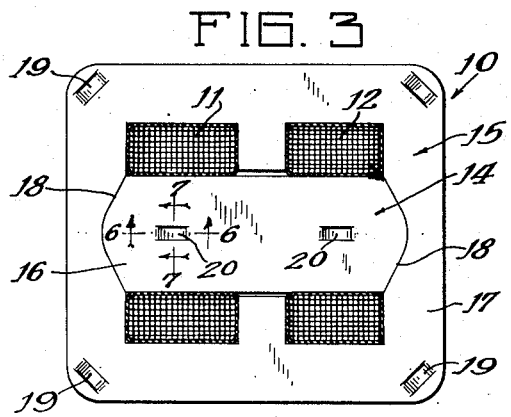
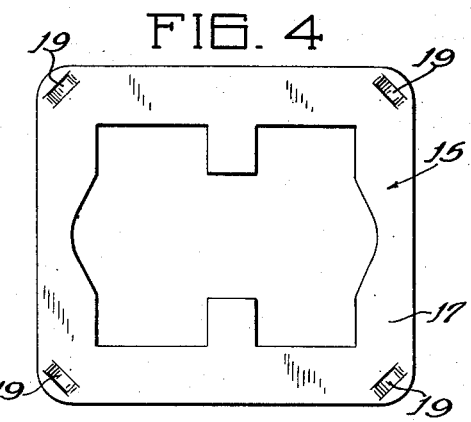
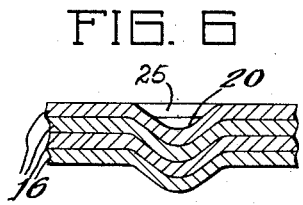
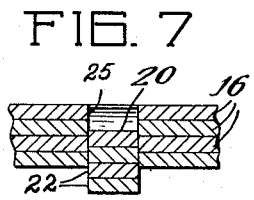
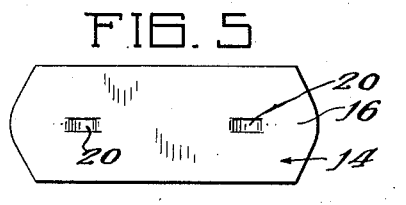
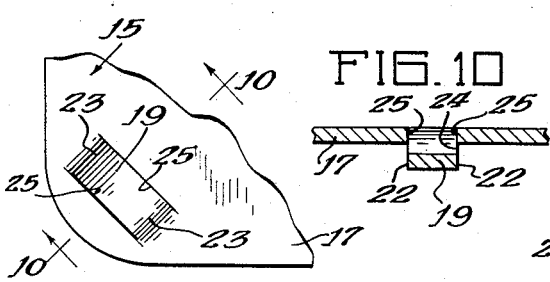
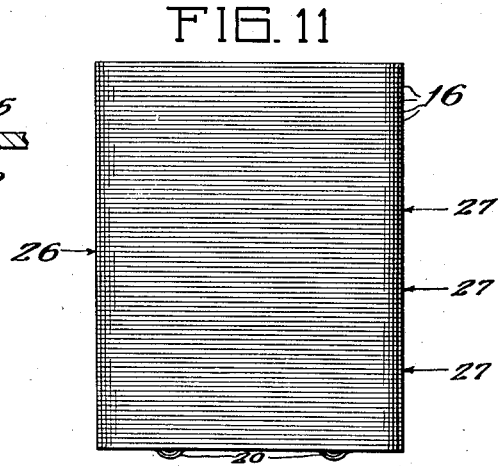
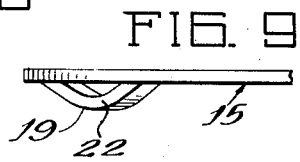
Inventor:
Walter Sliwiak
By Zabel & Gutbaugh
Attorneys Patented Mar. 16, 1954

2,671,951

UNITED STATES PATENT OFFICE 2,671,951

TRANSFORMER CORE AND METHOD OF MAKING SAME

Walter Sliwiak, Chicago, Ill., assignor to Jefferson Electric Company, Bellwood, Ill., a corporation of Illinois Application October 3, 1949, Serial No. 119,259

2 Claims. (Cl. 29—155.61)

This invention relates to an improved transformer core and to the method of making the same.

Heretofore, the laminations of a core have been secured to each other in a stack either by one or more rivets which pass through aligned apertures in the laminations, or by a strap or other clamping means which surrounds the laminations and serves to clamp them together.

It is an object of this invention to provide a core structure and a method of making the same which eliminates the necessity of using additional clamping elements, such as a rivet or a strap, the separate laminations according to my invention being formed so as to interlock with each other. Thus, a less costly structure is provided.

It is another object of my invention to provide a core structure comprising a plurality of stacks of laminations, the abutting surfaces of which are aligned with each other to provide a low reluctance joint. In the previously used rivet construction, due to the necessary clearance between the rivet and the rivet holes in the lamination, it has not been possible to attain aligned edge surfaces automatically. In that construction it was necessary to adjust the individual laminations either before or after heading over the rivet in order to secure the alignment necessary for a low reluctance joint.

A further object of my invention is to provide an improved method of securing separate laminations to each other in a stack.

Other objects, features and advantages will become apparent as the description proceeds.

With reference now to the drawings in which like reference numerals designate like parts:

Fig. 1 is a side elevation of a transformer embodying my invention;

Fig. 2 is an end view thereof;

Fig. 3 is a horizontal section taken along line 3—3 of Fig. 1;

Fig. 4 is a plan view of one of the yoke portion laminations;

Fig. 5 is a plan view of one of the winding leg laminations;

Fig. 6 is an enlarged sectional elevation taken along line 6—6 of Fig. 3;

Fig. 7 is an enlarged sectional elevation taken along line 7—7 of Fig. 3;

Fig. 8 is an enlarged plan view of a portion of a single lamination showing the extruded strip;

Fig. 9 is an edge view of Fig. 8;

Fig. 10 is a section taken along line 10—10 of Fig. 6; and

Fig. 11 is an elevation of a stack of laminations which illustrates one manner in which the laminations may be handled prior to the separation thereof into separate core elements.

Figs. 1, 2 and 3 show a transformer 10 which comprises coils 11 and 12 and a core designated generally by the reference numeral 13. One of the coils may constitute the primary winding and the other coil may constitute the secondary winding, the coil leads not being shown.

The particular transformer shown is provided with a press fit core, in which the core 13 comprises a winding leg 14 and a yoke portion 15. The winding leg is made up of a plurality of laminations 16 which are formed into a stack, and the yoke portion is made up of a plurality of laminations 17, also formed into a stack. The dimensions of the two stacks are such that after the coils 11 and 12 have been placed onto the winding leg, the winding leg 14 may be inserted into the yoke portion 15 by means of a press fit. The abutting surfaces of the two stacks are indicated by the reference numeral 18.

The laminations 16 and 17 are each provided with one or more strip extrusions 20 and 19 respectively. These strip extrusions are formed so as to cause adjacent laminations to interlock with each other in order that a coherent and self-sustaining core structure may be provided.

As shown in Figs. 6 to 10, each strip extrusion 19, 20 is in the form of a strip which is separated from the remainder of the lamination by two parallel slits, the middle part of the strip extrusion being offset from the plane of the remainder of the lamination. This offsetting provides a pair of edges, hereinafter referred to as extruded edges 22 which are substantially perpendicular to the plane of the lamination. The extruded strip is not entirely severed from the remainder of the lamination, but is attached thereto at one or both of its end parts 23. The punching of the strip extrusion 20 provides an opening 24 in the main part of the lamination which is bounded by edges referred to herein as coplanar edges 25. As shown in Fig. 7, the strip extrusions of one lamination are received within the opening of an adjacent lamination, the coplanar edges 25 engaging and interlocking with the extruded edges 22. Thus, the laminations are maintained in exact alignment with each other, provided that the location of the strip extrusions is identical in all of the laminations of the stack.

The strip extrusions 19 and 20 may be formed by any suitable means; however, it has been found convenient to punch the extrusions at the same time that the lamination is punched from the stock, thus assuring identity of location.

After punching a number of the separate laminations may be aligned in a press, and then pressed together into a stack 26, illustrated in Fig. 11. The stack may be of the height required in the final core structure, but for convenience in handling I have found it desirable to provide a stack of a height sufficient to make several core structures. The stack then may be broken up into sections as indicated by the arrows 27, each section constituting a winding leg 14. The same procedure may be followed with respect to yoke portion 15.

I have found that although each lamination is interlocked only with the two or three adjacent laminations, the interlocking is sufficiently secure as to provide a very rigid stack or core structure, this result being due to the fact that the width of the strip extrusion is practically identical to the width of the opening 24, the identity of dimensions being such that considerable force is required in pressing the laminations together into a stack.

The utility of my invention as applied to a press fit core construction is obvious since unless the alignment of the abutting edges 16 is good enough to permit the insertion of the winding leg 14 into the yoke portion 15 initially, the proper low reluctance joint will not be obtained. However, it is just as important to obtain a low reluctance joint in other types of core structures, such as abutting E-shaped stacks, and the present invention provides a means of obtaining such joints automatically.

I have found that when constructing the laminations from 24 or 26 gauge steel that an indentation having an angle of substantially 116° is suitable. In general, the smaller the angle and deeper the indentation, the greater the interlocking effect. However, when the angle of indentation is too small, it is difficult to obtain surface to surface contact of adjacent laminations. The 116° angle above mentioned has been found to be entirely satisfactory for laminations of all thicknesses up to 24 gauge steel.

Although I have shown only a preferred embodiment of my invention, it will be understood that various modifications and changes can be made herein without departing from the scope of the invention as defined by the appended claims.

I claim:

1. The method of making a core structure of substantial thickness for electromagnetic apparatus comprising the steps of taking a plurality of identical sheet metal laminations, forming identically located identical offset portions in each of said laminations, each offset portion being in the form of two parallel slits, the stock between said slits being offset to provide said offset portion, and the ends of said offset portion being integral with the remainder of said lamination, the formation of said slits providing offset edges which constitute the side edges of said offset portion and coplanar edges which define an opening in the plane of said lamination, said offset edges being aligned in a direction perpendicular to the plane of said lamination with said coplanar edges, stacking said laminations with the correspondingly located offset portions of said laminations in registry with each other, and pressing said laminations together so that the offset portions of one lamination enter into the openings formed in an adjacent lamination, with said offset edges of one lamination engaging the coplanar edges of an adjacent lamination to provide a frictional lock, said lamination stack being of a height substantially greater than the extent of offset of said offset portions, in order to provide a core structure of substantial thickness.

2. The method of making a core structure of substantial thickness for electromagnetic apparatus as claimed in claim 1 wherein said identical laminations are of open rectangular shape, and wherein said identically located offset portions are formed in each of the four corners of each of said laminations.

WALTER SLIWIAK.

References Cited in the file of this patent
UNITED STATES PATENTS

| Number | Name | Date |
| --- | --- | --- |
| 430,000 | Clark | June 10, 1890 |
| 512,021 | Gould | Jan. 2, 1894 |
| 977,178 | Ferguson | Nov. 29, 1910 |
| 1,297,161 | Hendricks | Mar. 11, 1919 |
| 1,635,064 | Wagner | July 5, 1927 |
| 2,254,558 | Williams | Sept. 2, 1941 |
| 2,552,109 | Nahman | May 8, 1951 |